US012578608B2

(12) United States Patent
Deb et al.

(10) Patent No.: US 12,578,608 B2
(45) Date of Patent: Mar. 17, 2026

(54) ELECTROCHROMIC BI-LAYERED DEVICES FOR DYNAMIC LIGHT THROUGHPUT CONTROL AND A PROCESS FOR THE PREPARATION THEREOF

(71) Applicant: Council of Scientific & Industrial Research, New Delhi (IN)

(72) Inventors: Biswapriya Deb, Thiruvananthapuram (IN); Gayathri Prabhu Thulichal Ganesh Prabhu, Thiruvananthapuram (IN); Ranjana Venugopal, Thiruvananthapuram (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 429 days.

(21) Appl. No.: 18/020,794

(22) PCT Filed: Aug. 11, 2021

(86) PCT No.: PCT/IN2021/050772
§ 371 (c)(1),
(2) Date: Feb. 10, 2023

(87) PCT Pub. No.: WO2022/034615
PCT Pub. Date: Feb. 17, 2022

(65) Prior Publication Data
US 2023/0305351 A1 Sep. 28, 2023

(30) Foreign Application Priority Data
Aug. 11, 2020 (IN) .............................. 202011034413

(51) Int. Cl.
*G02F 1/1524* (2019.01)
*G02F 1/15* (2019.01)

(52) U.S. Cl.
CPC ...... *G02F 1/1524* (2019.01); *G02F 2001/164* (2019.01); *G02F 2202/36* (2013.01)

(58) Field of Classification Search
CPC .. G02F 1/1524; G02F 1/15165; G02F 1/1525; G02F 2001/15025; G02F 2001/1555; G02F 2001/164
See application file for complete search history.

(56) References Cited

U.S. PATENT DOCUMENTS

| | | | |
|---|---|---|---|
| 2014/0002884 A1* | 1/2014 | Marcel .................. | G02F 1/1524 |
| | | | 428/701 |
| 2019/0196291 A1* | 6/2019 | Wang ...................... | G02F 1/161 |
| 2022/0308416 A1* | 9/2022 | Rozbicki ............... | G02F 1/1524 |

FOREIGN PATENT DOCUMENTS

| | | |
|---|---|---|
| FR | 2969323 A1 | 6/2012 |
| KR | 20170101702 A | 9/2017 |

(Continued)

OTHER PUBLICATIONS

Nicholas Leventis et al., "Preparation and Characterization of Tungsten Trioxide/Dibenzyl Viologen Polymer Bilayer Electrochromic Films", Journal of Materials Chemistry, vol. 3 (8), (1993), pp. 833-839. DOI: 10. 1039/JM9930300833 (Year: 1993).*

(Continued)

*Primary Examiner* — George G. King
(74) *Attorney, Agent, or Firm* — DINSMORE & SHOHL LLP

(57) ABSTRACT

Broadband electrochromic devices (ECDs) with independent band-selectivity over visible and near-infrared (NIR) radiation have attracted immense interest because of their functional benefits over the conventional ECDs. The independent dual band activity in ECDs usually needs special architecting by blending/layering different materials having activity in two different regions. The present invention provides a broadband electrochromic device that comprises (Continued)

a layer of polycrystalline nanosheets and an amorphous porous layer. Here we demonstrated achieving a remarkably high visible modulation with unprecedented NIR blocking performance by employing a bi-layered electrode of the same material, i.e. porous a-$WO_3$ layer on top of polycrystalline $WO_3 \cdot H_2O$ nanosheets. This facile and inexpensive electrode preparation could provide a new platform for realizing high-performing dynamic smart glass with extraordinary spectrally-selective energy saving.

9 Claims, 9 Drawing Sheets

(56)                         References Cited

FOREIGN PATENT DOCUMENTS

| WO | 2013016318 | A2 | 1/2013 |
|----|------------|-----|--------|
| WO | 2013032790 | A2 | 3/2013 |
| WO | 2016134010 | A1 | 8/2016 |
| WO | 2017141528 | A1 | 8/2017 |

OTHER PUBLICATIONS

Shi et al. "Construction of WO3/Ti doped WO3 bi layer nanopore arrays with superior electrochromic and capacitive performances" Tungsten, vol. 1, pp. 236-244, (2019) (Year: 2019).*
Wikipedia webpage "Thin film" as of 2019 (Year: 2019).*
Wikipedia webpage "Electrochromic devices" as of 2019 (Year: 2019).*
International Search Report mailed Nov. 25, 2021 in reference to co-pending Indian Application No. PCT/IN2021/050772 filed Aug. 11, 2021.
Written Opinion International Search Report mailed Nov. 25, 2021 in reference to co-pending Indian Application No. PCT/IN2021/050772 filed Aug. 11, 2021.
Llordes, et al., "Tunable near-infrared and visible-light transmittance in nanocrystal-in-glass composites", Nature Letter, vol. 500, pp. 323-328, Aug. 15, 2013.
Runnerstrom, et al., "Nanostructures electrochromic smart windows: traditional materials and NIR-selective plasmonic nanocrystals", ChemComm, vol. 50, pp. 10555-10572, 2014.
Garcia, et al., "Near-Infrared Spectrally Selective Plasmonic Electrochromic Thin Films", Advanced Optical Mater, vol. 1, pp. 215-220, 2013.
Zhao, et al., "Highly Electrically Conductive Three-Dimensional Ti3C2Tx MXene/Reduced Graphene Oxide Hybrid Aerogels with Excellent Electromagnetic Interference Shielding Performances", ACS Nano Publications, pp. 1-41, 2018.
Wang, et al., "Using Intrinsic Intracrystalline Tunnels for Near-Infrared and Visible-Light Selective Electrochromic Modulation", Adv. Optical Mater, pp. 1-6, 2017.
Gayathri, et al., "Hydrated tungsten oxide nanosheet electrodes for broadband electrochromism and energy storage", Materials Today Energy, vol. 10, pp. 380-387, 2018.
Gayathri, et al., "Designing an All-Solid-State Tungsten Oxide Based Electrochromic Switch with a Superior Cycling Efficiency", Adv. Mater. Interfaces, pp. 1-8, 2017.
Gayathri, et al., "Tuning of physical and electrochemical properties of nanocrystalline tungsten oxide through ultraviolet photoactivation", Electrochimica Acta, vol. 272, pp. 135-143, 2018.
Svensson, et al., "Eletrochromic Coatings for Smart Windows: Crystalline and Amorphous $WO_3$ Films", Thin Solid Films, vol. 126, pp. 31-36, 1985.
Qu, et al., "One-pot preparation of crystalline-amorphous double-layer structured $WO_3$ films and their electrochromic properties", Electrochimica Acta, vol. 148, pp. 46-52, 2014.

* cited by examiner

Prior Art

Height　　　　　　　600 nm

ELECTROCHROMIC BI-LAYERED DEVICES FOR DYNAMIC LIGHT THROUGHPUT CONTROL AND A PROCESS FOR THE PREPARATION THEREOF

CROSS-REFERENCES TO RELATED APPLICATIONS

This application is a national-stage application under 35 U.S.C. § 371 of International Application No. PCT/IN2021/050772, filed Aug. 11, 2021, which International Application claims benefit of priority to Indian Application No. 202011034413, filed Aug. 11, 2020.

FIELD OF THE INVENTION

The present invention relates to an electrochromic device for dynamic light throughput control fabrication of electrochromic coatings and devices. Particularly, the present invention relates to the electro-chromic bilayer coatings achieving a remarkably high broadband optical modulation extending from visible to infrared wavelength region, wherein, the modulation wavelength of the bilayer is voltage selective. More particularly, present invention further relates to fabrication process of electro-chromic devices using the above mentioned bilayer electrode.

BACKGROUND AND PRIOR ART OF THE INVENTION

Electrochromism is defined as the reversible change in optical properties by application of an electric voltage. Electrochromic materials are exploited in electrochemical devices that modulate their transmittance, reflectance, absorbance or emittance. A typical electrochromic device (ECD) is constructed by sandwiching an ion-conducting electrolyte between two transparent conducting oxide coated glasses (TCO/glass), at least one of which should be laminated with the active layer. The use of a complimentary electrochromic coating in the other electrode is optional that can offer more stability, neutral color rendition etc. FIG. 1 schematically shows the cross section of an ECD with cathodic and anodic electrochromic coatings in the complimentary substrates. The electrolyte film should be ion (Mt) conducting and electron (e-) blocking to prevent electrical shorting of two electrodes. The electrochromic layer becomes colored or bleached when a suitable voltage pulse is applied while the counter electrode layer acts as the ion storage/color neutralizing layer. The coloration efficiency, modulation wavelength range, response time, write-erase efficiency etc. are some of the yardsticks for performance assessment of an ECD.

Reference may be made to a patent FR2969323A1/FR2969323B1 wherein a solid state infrared active electrochromic device with bi-layered electrode was described.

Reference may be made to a Patent PCT/US2012/047935 wherein a, dynamic (visible and NIR modulating) ECD was reported by architecting a blend of $WO_{3-x}$ nanocrystals and a-$NbO_x$ glass.

Reference may be made to the articles D. J. Milliron et al., Nature 2013, 500, 323; D. J. Milliron et al., Chem. Commun. 2014, 50, 10555; D. J. Milliron et al., Adv. Opt. Mater. 2013, 1, 215 wherein the plasmonicelectrochromic (EC) nanocrystals of transparent conducting oxides (TCO) (such as indium doped tin oxide or aluminum doped zinc oxide) that exhibited high contrast NIR modulation was developed and blended with a visually modulating component.

Reference may be made to an article H. Gu et al., ACS Nano, 2018, 12, 559 wherein a voltage selective EC modulation zones by the electrodes made with sequential deposition of the crown-type polyoxometalates ($K_{28}Li_5H_7P_8W_{48}O_{184}\cdot92H_2O$) and $W_{18}O_{49}$ nanowires was demonstrated.

Reference may be made to an article Z. Wang et al., Adv. Opt. Mater. 2017, 5, 1700194 wherein a simplified approach was presented by utilizing the intrinsic structural tunnels of the upper layer (Prussian Blue) to facilitate the accommodation and transportation of ions that can trigger NIR modulation in the second layer ($W_{18}O_{49}$).

Reference may be made to patent KR20170101702A wherein it relates to an electrochromic element with improved electrochromic speed and durability, and a manufacturing method thereof. The electrochromic element sequentially comprises a first substrate, a first electrode layer, an electrochromic layer, an electrolyte layer, an ion storage layer, and a second electrode layer.

In the present invention, electrochromic devices by combining together nanocrystalline and amorphous $WO_3$ electrochromic layers have been developed. The invention disclosed here offers benefit and novelty by circumventing many processing and operational disadvantages described in the prior art. In addition, the invention also describes the process of selecting electrochromic materials so that those could be effectively stacked as a layer for enhancing the device functionalities.

Novelty of the present invention lies in the aspect that it describes the process of screening/selecting electrochromic materials so that those could be effectively stacked as a layer for enhancing the device functionalities. Further, use of these materials for fabricating electrochromic devices is not present in the prior art. Also the order of stacking to make a spectrally selective electrode is not present in the prior art.

Abbreviations Used a-$WO_3$—amorphous tungsten oxide
$WO_3$—Tungsten oxide
ECD—Electrochromic Device
TCO—Transparent conductive oxides
FTO—Fluorine doped Tin Oxide
$LiClO_4$—Lithium perchlorate
NIR—Near Infrared
PC—Propylene carbonate
PMMA—Polymethylmethacrylate
THF—Tetrahydrofuran
SPE—Solid Polymer Electrolyte
XRD—X-ray Diffraction
SEM—Scanning Electron Microscopy
TEM—Transmission Electron Microscopy

OBJECTIVES OF THE INVENTION

The main objective of the present invention is to provide an electrochromic bilayer electrode by stacking two different electrochromic layers with different spectral selectivity driven by different voltages.

Another objective of the present invention is to provide an electrochromic overcoating layer that can effectively allow the access of the bottom layer to electrolyte ions.

Yet another objective of the present invention is to provide an electrochromic undercoating layer that has both operational voltage and spectral wavelength offsets compared to the top layer.

Yet another objective of the present invention is to provide a dynamic spectrally selective ECD with highly efficient visible and infrared modulation.

SUMMARY OF THE INVENTION

Accordingly, present invention provides a bi-layered electrochromic electrode comprising:
- i. a conductive base consisting of a substrate [15] coated with transparent conductive oxide [TCO] [13];
- ii. electrochromic layer [11] coated on the conductive base and;
- iii. electrochromic layer [12] deposited on the electrochromic layer [11], wherein the thickness of the electrochromic layer [11 and 12] is ranging between 10.0 nm to 3.0 μm.

In an embodiment of the present invention, the substrate is selected from the group consisting of glass, quartz, cellulose, silk or plastics selected from the group consisting of polythene, polyimide, polyacrylate, polycarbonate.

In another embodiment of the present invention, the conductive base is having sheet resistance range from 1.0 μΩ/sq to 50.0 Ω/sq.

In yet another embodiment of the present invention, the transparent conductive oxide [TCO] is selected from the group consisting of indium zinc oxide (IA)), indium tin oxide (ITO), fluorine doped tin oxide (FTO), fluorine doped zinc oxide (FZO), aluminium doped zinc oxide (AZO) and aluminium doped tin oxide (ATO).

In yet another embodiment of the present invention, the electrochromic layer [11 and 12] are selected from the group consisting of organic compounds such as viologens, thiophenes, fluorenes, metal complexes such as bipyridene complexes, terpyridine complexes etc., conjugated polymers such as polythiophenes, polypyrroles, polyanilines, polycarbazoles, metal oxides with pure and substochiometric phases such as $WO_3$, $TiO_2$, $MoO_3$, $NiO$, $V_2O_5$, $ZnO$, $Ta_2O_5$, $Cr_2O_3$, $MnO_2$, $Fe_2O_3$, $CoO_2$, $RhO_2$, $IrO_2$, $Nb_2O_5$ etc. or their combinations/hybrids.

In yet another embodiment of the present invention, the electrochromic layer [12] can be even same chemical composition of the electrochromic layer [11] with different crystallinity, porosity or dopant/additive concentrations.

In yet another embodiment of the present invention, the electrochromic layer [12] have same voltage polarity response (cathodic, anodic or dual) as the electrochromic layer [11].

In yet another embodiment, present invention provides a bi-layered electrochromic device comprising:
- a. a bi-layered electrochromic electrode [active electrode];
- b. an electrolyte i.e. Ion conducting layer [10] placed on top of the electrochromic layer [12] of the active electrode;
- c. a counter electrode placed over the exposed side of the electrolyte comprising a conductive base consisting of a transmissive or reflective substrate [16] coated with transparent conductive oxide [TCO] [14].

In yet another embodiment of the present invention, the counter electrode is optionally coated with a complimentary coating comprising of different electrochromic layer of opposing voltage polarity response of the active electrode.

In yet another embodiment of the present invention, the conductive bases of the active electrode and counter electrode are electrically connected to the terminals with opposite polarity.

In yet another embodiment of the present invention, said device shows color change with the application of a voltage in the range of ±0.5 to ±10.0 V against counter electrode.

In yet another embodiment of the present invention, said device shows the spectral response of overcoating if the undercoating and complimentary coating, if any used in counter electrode are spectrally non-responsive in the applied voltage value and vice-versa.

In yet another embodiment of the present invention, the solution/dispersion/polymeric film incorporates either $H_2SO_4$ or $Li^+$, $Na^+$, $K^+$, and $Al^{3+}$ based salts or their mixtures.

In yet another embodiment of the present invention, showing a superimposed spectral response arising from undercoating, overcoating and complimentary coatings (if used in counter electrode) subjected to a voltage in the range of ±0.5 to ±10.0 V with respect to counter electrode.

In yet another embodiment, present invention provides a process for the preparation of bi-layered electro-chromic electrode comprising the steps of:
- a. dissolving tungsten powder in 50% $H_2O_2$ with stirring for a period in the range of 24-36 h followed by filtration to obtain a colorless transparent liquid;
- b. decomposing excess hydrogen peroxide from the liquid as obtained in step (a) by stirring for a period in the range of 4-6 h at a temperature in a range of 80-90° C. to obtain a deep yellow color solution;
- c. drying the solution as obtained in step (b) to obtain tungsten oxide hydrate powder;
- d. dispersing the tungsten oxide hydrate powder as obtained in step (c) in water followed by sonication for a period in the range of 7-10 h to obtain a solution of tungsten oxide hydrate [$WO_3 \cdot H_2O$];
- e. dispersing the tungsten oxide hydrate powder as obtained in step (c) in 10% aqueous $H_2O_2$ followed by sonication for a period in the range of 7-10 h to obtain a solution of a-$WO_3$;
- f. drop casting 20-30 μL the solution as obtained in step (d) on a clean FTO substrate followed by evaporation at a temperature in the range of 50-80° C. for a period in the range of 15-30 minutes to obtain a polycrystalline layer 1 of $WO_3 \cdot H_2O$ having thickness in the range of 800 to 1000 nm;
- g. drop casting 20-30 μL the solution as obtained in step (e) on the uniform film as obtained in step (i) followed by evaporation at a temperature in the range of 50-80° C. for a period in the range of 15-30 minutes to obtain the porous amorphous layer 2 of a-$WO_3$ having thickness in the range of 600 to 1000 nm.

In yet another embodiment, present invention provides a process for fabricating the electrochromic device comprising the steps of:
- a. dissolving anhydrous $LiClO_4$, plasticizer and PMMA in a solvent selected from the group consisting of tetrahydrofuran [THF], chloroform, DCM, DMSO, DMF, toluene, ethyl acetate, diethyl ether, acetonitrile, carbon tetrachloride, 2-propanol, hexane, benzene or acetone followed by stirring at a temperature in the range of 60-80° C. for a period in the range of 12-24 h to obtain a homogeneous mixture;
- b. evaporating the solvent at a temperature in the range of 80-90° C. under dry nitrogen flow to obtain solid polymer electrolytes;
- c. stacking polycrystalline $WO_3 \cdot H_2O$ nanosheet and porous a-$WO_3$ layer to obtain an active electrode;
- d. embedding the solid polymer electrolytes having thickness in the range of 130-250 μm as obtained in step (b) between the active electrode and reflective electrode to obtain the electro-chromic device.

In yet another embodiment of the present invention, the plasticizer is independently selected from the group consisting of propylene carbonate; 4-(hydroxymethyl)-1,3-dioxolan-2-one; carbonic acid dibutyl ester; 1-(3-hydroxypropyl) 2-pyrrolidone; 1-octyl-2-prrolidone; 5-dodecanolide; 1-hexyl-3-methylimidazolium chloride; 1-methyl-3-octylimidizolium chloride; 2,2-dimethyl-1,3-hexanediol; 2-methyl-1,3-pentanediol; 1-cyclohexyl-2-methyl-1,3-pentanediol; 2,4-diethyl-1,5-pentanediol; 1,3-nonanediol; 2-butyl-1,3-octanediol; 3-methylpentane-1,3,5-triol; 2-ethyl-1,3-hexanediol; benzyl alcohol; 3-methyl-1,5-pentanediol; 1-phenoxy-2-propanol; 2-(2-butoxyethoxy)ethanol; bis(2-ethylhexyl)phosphate; tributyl phosphate; and tris (2-ethylhexyl)phosphate; linear carbonates; cyclic carbonates; linear primary alcohols; linear and branched aliphatic diols, linear and branched aliphatic triols; benzyl alcohol; linear and cyclic ureas; linear or cyclic urethanes; thioureas; thiourethanes; linear thio-oxocarbonates; pyrrolidon-2-ones; dihydrofuran-2-ones; piperidin-2-ones or pyran-2-ones.

In yet another embodiment of the present invention, the said device is useful in smart windows, smart mirrors, e-papers, smart displays, helmet visors, smart ophthalmic glasses, optical data storage devices, glare reduction set-ups, heat and light transmission modulators, integrated charge storage devices.

6

Figure 15:
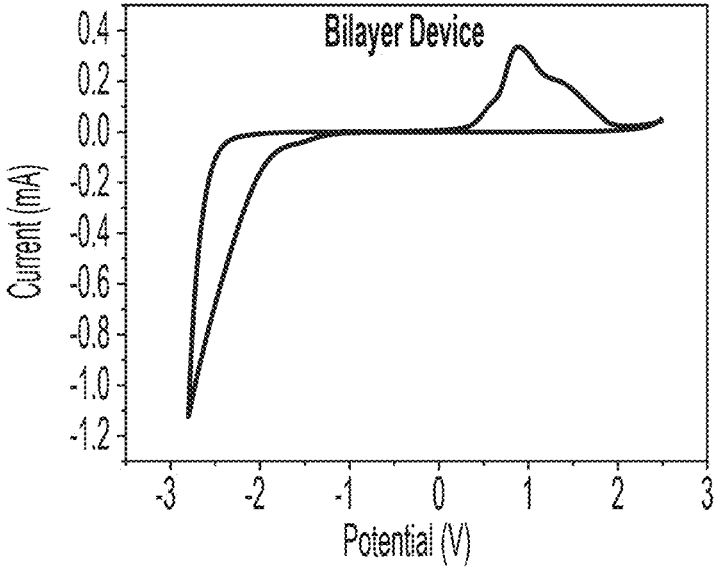

FIG. 15 represents the cyclic voltammetry plot of the electrochromic bi-layered device made using polycrystalline $WO_3 \cdot H_2O$ nanosheets and porous a-$WO_3$ layer.

Figure 16:
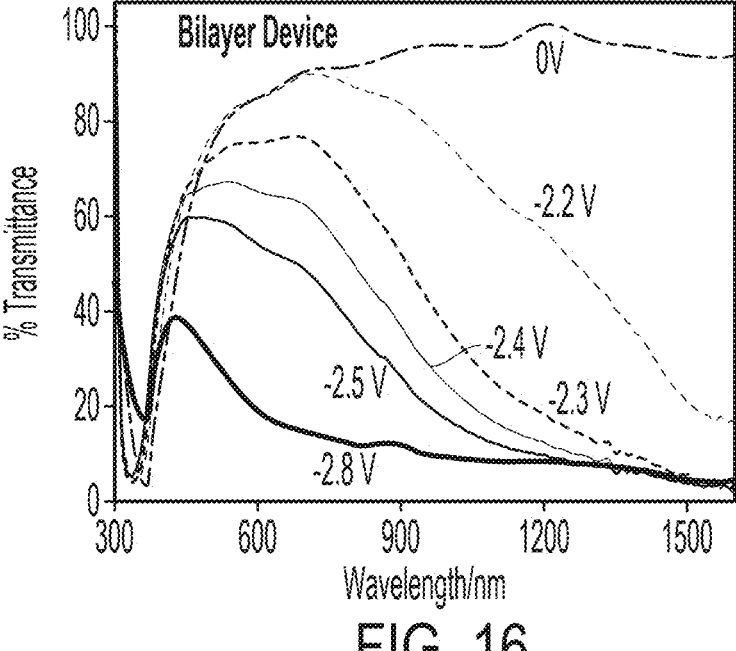

FIG. 16 represents the transmittance plot of the electrochromic bi-layered device made using polycrystalline $WO_3 \cdot H_2O$ nanosheets and porous a-$WO_3$ layer.

Figure 17:
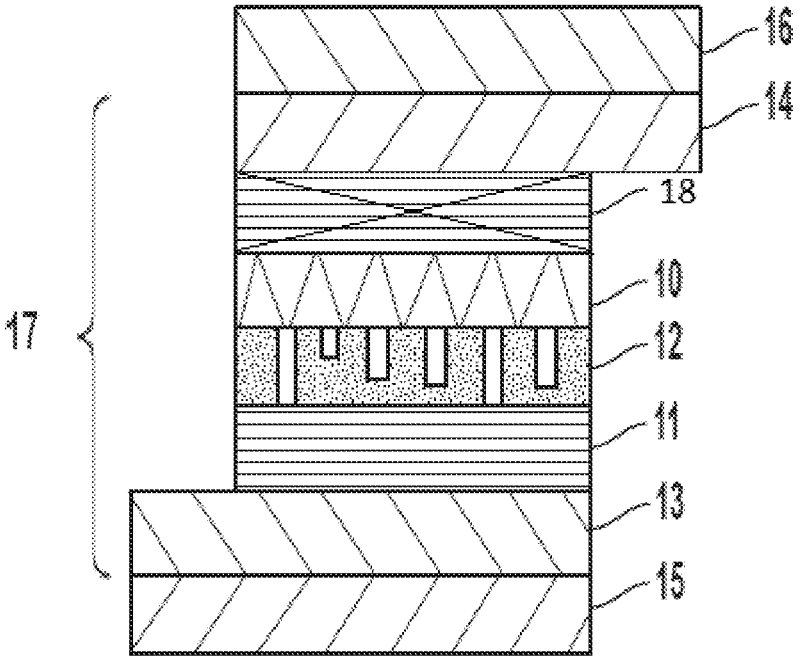

FIG. 17 represents the schematic representation of the bi-layered electrochromic device assembly of the present invention, referred to as device 4.

DETAILED DESCRIPTION OF THE INVENTION

Present invention demonstrates a novel scheme for making broadband ECDs with independent dual-band selectivity over visible and NIR radiation.

The present disclosure is about processing of a high quality, high spectral range and spectrally selective electrochromic electrodes and devices. The target is achieved by stacking two similar/dissimilar electrochromes with special morphologies.

The substrate of electrochromic electrode material being from the group consisting of glass, quartz, cellulose, silk or plastics (e.g. polythene, polyimide, polyacrylate, polycarbonate etc.) for transmissive electrode. For making reflective electrodes, the substrate is additionally coated with materials selected from the metallic coatings consisting chromium, silver, gold, tantalum, titanium etc. coatings on one or either sides.

The transmissive (or reflective) electrode is coated with electrically conducting coating materials being from the group consisting of indium zinc oxide (IZO), indium tin oxide (ITO), fluorine doped tin oxide (FTO), fluorine doped zinc oxide (FZO), aluminium doped zinc oxide (AZO) and aluminium doped tin oxide (ATO), conductive metallic coatings or their mixtures/hybrids.

The conductive coating has sheet resistance range from 1.0 $\mu\Omega$/sq-50.0 $\Omega$/sq.

The electrolyte bath for testing electrodes were fabricated using liquid electrolyte. The electrolyte is made of solution/dispersion containing a salt selected from the group consisting of $H_2SO_4$, $LiClO_4$, $ZnCl_2$, $LiBf_4$, $LiAsF_6$, LiI, LiBr, $LiCF_3SO_3$, LiTFSI, $KYF_4$, $KNO_3$, $KBrO_3$, KI, $KBF_4$, KOH, KSCN, $K_2Cr_2O_7$, KCl, $KCH_3CO_2$, $NH_4SCN$, $NH_4CH_3CO_2$, $NH_4Br$, $NH_4Cl$, NaSCN, $NaPF_6$, $NaYF_4$ or their mixtures/hybrids/combinations.

The conducting coating of the electrode is further coated with electrochromic materials to fabricate the active electrode wherein the materials being selected from a group consisting of:

(i) Transition metal oxides, selected from the group consisting of $WO_3$, $TiO_2$, $MoO_3$, NiO, $V_2O_5$, $Fe_2O_3$, $Ta_2O_5$, $Cr_2O_3$, $MnO_2$, $FeO_2$, $CoO_2$, $RhO_2$, $RO_2$, $Nb_2O_5$ etc.;

(ii) Other metal oxides, selected from the group consisting of $SnO_2$, $Bi_2O_3$, and $Pb_3O_4$;

(iii) Organic molecules selected from the group consisting of viologens, thiophenes, fluorenes etc.;

(iv) Metal complexes selected from the group consisting of bipyridene complexes, terpyridine complexes etc.;

(v) Conjugated polymers selected from the group consisting of polythiophenes, polypyrroles, polyanilines, polycarbazoles etc.;

(vi) Their combinations and hybrids.

The electrochromic coating has a thickness ranging 10.0 nm-3.0 $\mu$m.

The electrochromic coating show color change while dipped in an electrolyte solution with the application of a suitable voltage, e.g. 0.1-3.0 V against Ag/AgCl reference electrode.

The electrochromic coating on the electrode is further encrusted with a second electrochromic layer, the materials of which having different electrochromic response from the first layer but respond to the same voltage polarity. The materials of the second electrochromic layer being selected from the groups described in the preceding embodiment but having enough discontinuity to allow access of the first electrochromic layer to the electrolyte ions. The chemical composition of this second electrochromic layer could be chosen to be similar to the first electrochromic layer but differing in electrochromic response that could be achieved through altering the phase, crystallinity, morphology and dopant concentration etc.

The second electrochromic coating has a thickness ranging 10.0 nm-3.0 μm.

The second electrochromic coating show color change while dipped in an electrolyte solution with the application of a suitable voltage, e.g. 0.1-3.0 V against Ag/AgCl reference electrode.

The conductive electrode is optionally coated with materials chosen from groups described in the preceding embodiments but respond to opposite voltage polarity than that of the active electrode. These electrodes with or without the above described complimentary coatings were used as the counter electrodes in the device set-ups.

The electrochromic devices were fabricated using liquid/gel/solid electrolyte. The electrolyte is made of solution/dispersion/polymeric film containing a salt selected from the group consisting of $LiClO_4$, $ZnCl_2$, $LiBf_4$, $LiAsF_6$, LiI, LiBr, $LiCF_3SO_3$, LiTFSI, $KYF_4$, $KNO_3$, $KBrO_3$, KI, $KBF_4$, KOH, KSCN, $K_2Cr_2O_7$, KCl, $KCH_3CO_2$, $NH_4SCN$, $NH_4CH_3CO_2$, $NH_4Br$, $NH_4Cl$, NaSCN, $NaPF_6$, $NaYF_4$ or their mixtures/hybrids/combinations.

The electrochromic devices were fabricated by sandwiching the electrolyte layer (described in the preceding embodiment) between the active and counter electrodes. The electrolyte formed a continuous, homogeneous and electrically connecting interface with the second electrochromic layer on one side and conducting plane (with optional complimentary coating) of the counter electrode in the other side. The device arrangement can be made using a spacer that prevents electrical shorting of the active and counter electrodes. The devices can be completely sealed with sealants for weather proofing.

The active electrode and counter electrode are electrically connected to the opposite terminals of a voltage source The devices show color change with the application of a suitable voltage, e.g. 0.5-10.0 V against counter electrode.

The devices show a superimposed spectral response arising from the first and second (and complimentary coating in the counter electrode, when used) electrochromic coatings. The devices show the spectral response similar to the first electrochromic coating if the second electrochromic (and complimentary) coatings are spectrally non responsive in the applied voltage value. The devices show the spectral response similar to the second electrochromic coating if the first electrochromic (and complimentary) coatings are spectrally non responsive in the applied voltage value.

The electrochromic devices show spectral band selectivity while suitable materials are chosen that has electrochromic response in different spectral ranges with different bias requirements.

The electrochromic electrode has individual electrodes fabricated by directly applying either overcoating or undercoating to the conductive base, e.g. overcoating-only or undercoating-only electrodes show color change while dipped in an electrolyte solution with the application of a suitable voltage, e.g. ±0.1 to ±3.0 V against Ag/AgCl reference electrode wherein color change of overcoating-only electrode differs from the undercoating-only electrode in the same applied voltage value wherein the applied voltage polarity is dependent on the voltage polarity response of materials used for undercoating or overcoating e.g. (−)ve for cathodic, (+)ve for anodic and either one for the dual electrochromic materials.

The electrolyte in which it is dipped for color switching contains either $H_2SO_4$ or $Li^+$, $Na^+$, $K^+$, and $Al^{3+}$ based salts or their mixtures.

The electrode shows a superimposed spectral response arising from both undercoating and overcoating while dipped in an electrolyte solution and subjected to ±0.1 to ±3.0 V.

The electrode shows the spectral response of undercoating if the overcoating is spectrally non-responsive in the applied voltage value and vice-versa.

The electrolyte has the solution/dispersion/polymeric film incorporated either $H_2SO_4$ or Lit, $Na^+$, $K^+$, and $Al^{3+}$ based salts or their mixtures.

The electrochromic device showing the spectral response of overcoating if the undercoating and complimentary coating, if any used in counter electrode are spectrally non-responsive in the applied voltage value and vice-versa.

The electrochromic device showing a superimposed spectral response arising from undercoating, overcoating and complimentary coatings (if used in counter electrode) subjected to a voltage in the range of ±0.5 to ±10.0 V with respect to counter electrode.

etc.) for transmissive electrode and coated with metallic (chrome, silver, gold, tantalum, titanium etc.) coatings on one or either sides for reflective electrode.

Figure 1:
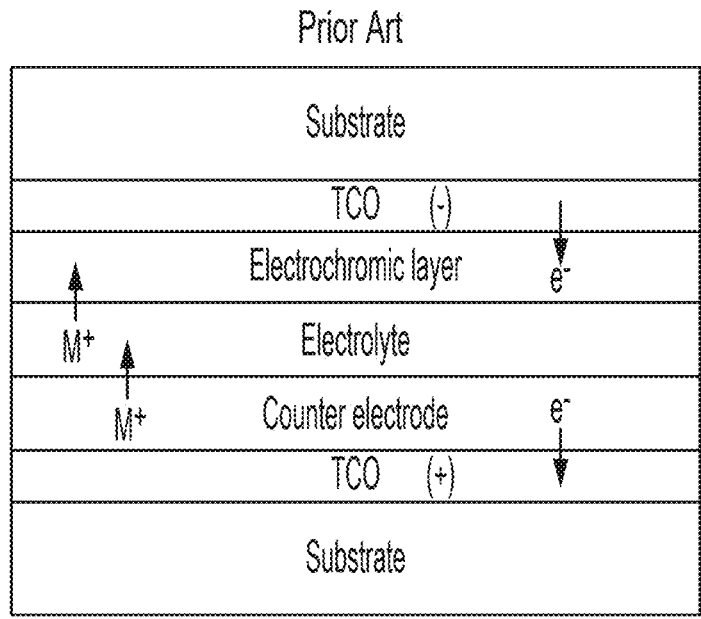
FIG. 1 schematically shows the cross section of an ECD with cathodic and anodic electrochromic coatings in the complimentary substrates.
Figure 2:
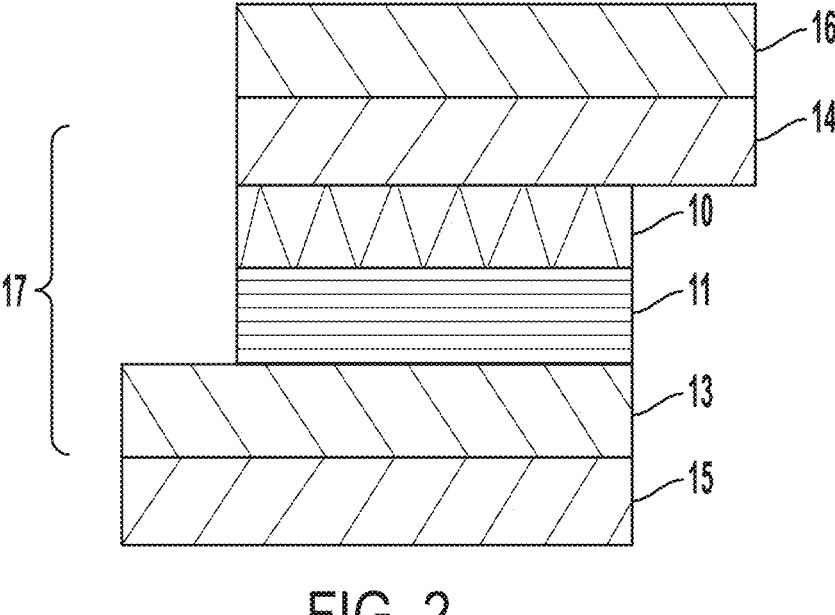
FIG. 2 represents the schematic representation of the polycrystalline $WO_3 \cdot H_2O$ nanosheets based electrochromic device assembly of the present invention, referred to as device 1.
Figure 3:
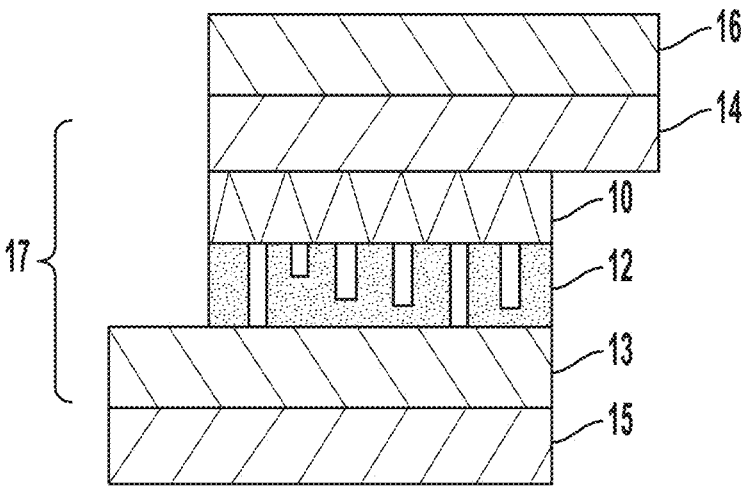
FIG. 3 represents the schematic representation of the porous a-$WO_3$ based electrochromic device assembly of the present invention, referred to as device 2.
Figure 4:
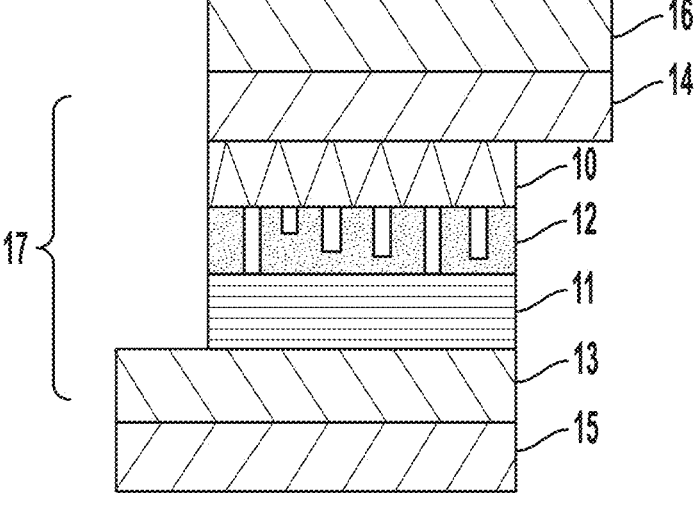
FIG. 4 represents the schematic representation of the bi-layered electrochromic device assembly of the present invention, referred to as device 3.
Figure 5:
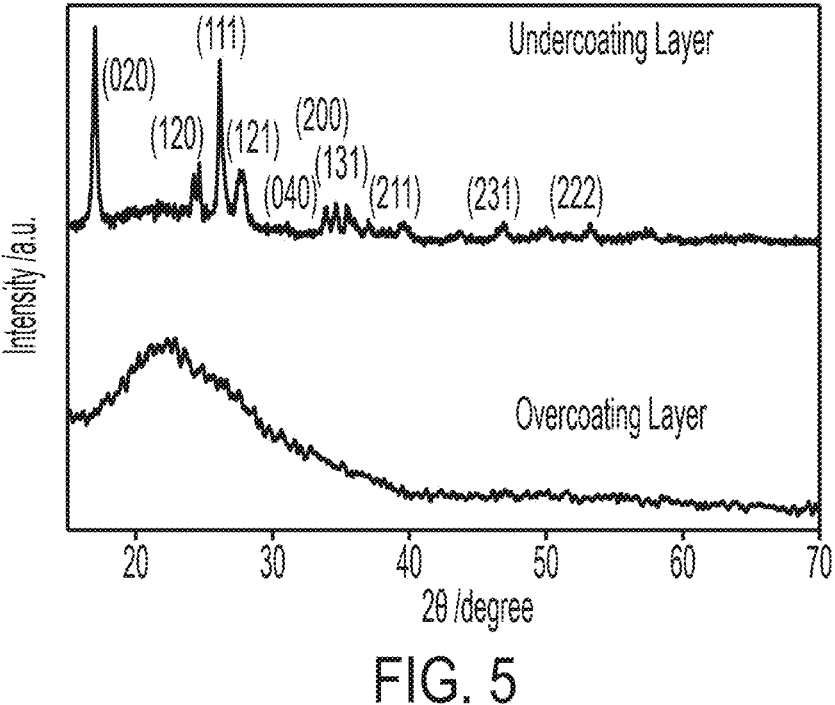
FIG. 5 represents the XRD image of the polycrystalline $WO_3 \cdot H_2O$ nanosheets and porous a-$WO_3$ materials on a quartz substrate of the present invention.
Figure 6:
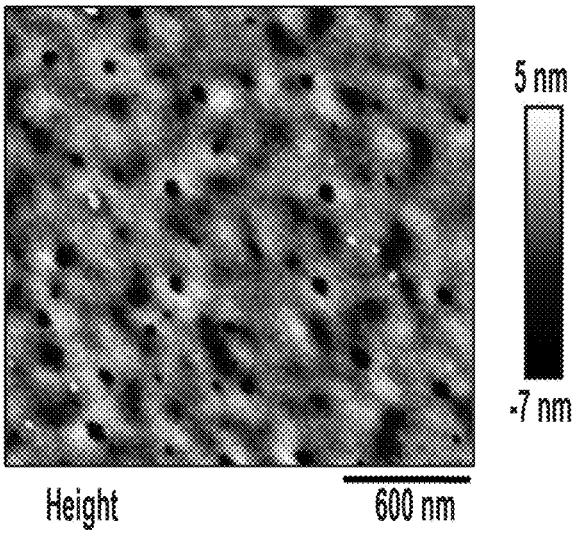
FIG. 6 represents the AFM image of the polycrystalline $WO_3 \cdot H_2O$ nanosheets of the present invention.
Figures 7, 8:
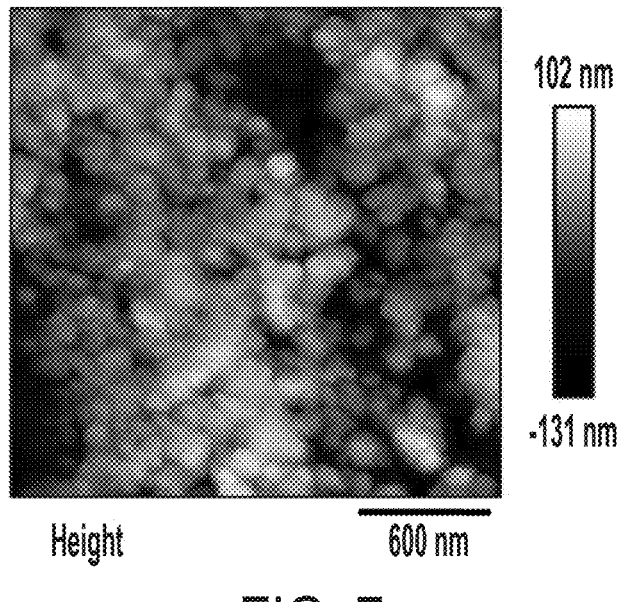
FIG. 7 represents the AFM image of the porous a-$WO_3$ of the present invention.
FIG. 8 represents the TEM image of the polycrystalline $WO_3 \cdot H_2O$ nanosheets of the present invention.

The FIGS. 2 and 3 represent the cross-sectional structural diagram of the electrochromic devices 1 and 2 respectively, whereas the FIG. 4 depicts the cross-sectional structural diagram of the electrochromic device 3 of the present invention. The electrochromic device 3 comprises of an ion conductor layer 10. The electrode layer 12 is in contact with the ion conductor layer 10 and the electrode layer 11 is in contact with the electrode layer 12. The layers 11 and 12 comprises of electrochromic material. The layers 10, 11, 12 are positioned between electrically conducting layers 13 and 14, which are arranged against the outer substrates 15 and 16. The layers 10, 11, 12, 13, 14 are together called the electrochromic stack, 17.

The electrically conductive layer 13 is in electrical contact with one terminal of a power supply and electrically conductive layer 14 is in electrical contact with the other terminal of the power supply whereby the transmittance of electrochromic device 3 may be changed by applying a voltage pulse to electrically conductive layers 13 and 14. The pulse causes electrons and ions to move between the electrode layers 11 and 12 and the ion conducting layer 10. As a result, electrochromic material in the first and second electrode layers change optical states, thereby switching electrochromic device 3 from a bleached state to a colored state or from a colored state to a bleached state.

FIG. 17 represents the cross-sectional structural diagram of the electrochromic device 4 of the present invention. The electrochromic device 4 is the same as electrochromic device 3 except that it further includes a complimentary electrochromic coating 18 in the counter electrode.

It should be understood that the term "bleached" refers to an optically neutral state, e.g., uncolored, transparent or translucent. Further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition. In general, the change in transmittance preferably comprises a change in transmittance to electromagnetic radiation having a wavelength in the range of infrared to ultraviolet radiation. For example, in one embodiment of the present invention, the change in transmittance is predominately a change in transmittance to electromagnetic radiation in the infrared spectrum. In another embodiment of the present invention, the change in transmittance is to electromagnetic radiation having wavelengths in the visible spectrum. In yet another embodiment, the change in transmittance is to electromagnetic radiation having wavelengths in the infrared and visible region.

The electrochromic device reversibly cycles between a bleached state and a colored state. In the bleached state, a potential is applied to the electrochromic stack 17 such that available ions in the stack that can cause the electrochromic material 11 and 12 to be in the colored state reside primarily in the counter electrode. When the potential on the electrochromic stack is reversed, the ions are transported across the ion conducting layer 10 to the electrochromic material 11 through the electrochromic layer 12 and cause the material to enter the colored state.

All of the materials making up electrochromic stack 17 are inorganic, solid (i.e., in the solid state), or both inorganic and solid. Because organic materials tend to degrade over time, inorganic materials offer the advantage of a reliable electrochromic stack that can function for extended periods of time. Materials in the solid state also offer the advantage of not having containment and leakage issues, as materials in the liquid state often do. Each of the layers in the electrochromic device is discussed in detail, below. It should be understood that anyone or more of the layers in the stack may contain some amount of organic material, but in many implementations one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapour deposition.

Any material having suitable optical, electrical, thermal and mechanical properties may be used as substrate 15 and 16. Such substrates include, for example, glass, plastic, and mirror materials. Suitable plastic substrates include, for example acrylic, polystyrene, polycarbonate, allyldiglycolcarbonate, SAN (styrene acrylonitrile copolymer), poly(4-methyl-1-pentene), polyester, polyamide, etc. If a plastic substrate is used, it is preferably barrier protected and abrasion protected using a hard coat of, for example, a diamond—like protection coating, a silica/silicone anti-abrasion coating, or the like, such as is well known in the plastic glazing art. Suitable glasses include either clear or tinted soda lime glass, including soda lime float glass. The glass may or may not be tempered.

On top of substrate 15 and 16 is conductive layer 13 and 14. In the present invention, both the conductive layers 13 and 14 are inorganic and solid. Conductive layers 13 and 14 may be made from a number of different materials, including conductive oxides, thin metallic coatings, conductive metal nitrides, etc. Typically, conductive layers 13 and 14 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminium zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used. Examples of metals used for such thin metallic coatings include transition metals including gold, platinum, silver, aluminium, nickel alloy, and the like. Thin metallic coatings based on silver, well known in the glazing industry, are also used. Examples of conductive nitrides include titanium nitrides, tantalum nitrides, titanium oxynitrides, and tantalum oxynitrides. The conductive layers 13 and 14 may also be composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 um or thinner).

Overlaying conductive layer 13 is the electrochromic layer. In the present invention, two electrochromic layers 11 and 12 are sequentially deposited. Generally, the electrochromic layers can be inorganic, organic, hybrid or solid, or in typical embodiments inorganic/organic/hybrid and solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide ($CuO$), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. Among the metal oxides, tungsten oxide ($WO_3$) has been the most extensively studied material. The metal oxide may also be doped with one or more dopants such as lithium, sodium, potassium, molybdenum, vanadium, titanium, and/or other suitable metals or compounds containing metals. Mixed oxides (e.g., W—Mo oxide, W—V oxide) can also be used as the electrochromic layer. For organic materials, viologens have been commercialized on small scale. Viologens are organic compounds with the general formula $(C_5H_4NR)_2^{n+}$. A variety of conducting polymers are also of interest, including polypyrrole, PEDOT, polyaniline, etc. In the present invention, different morphologies of $WO_3$ with different crystallinities are used for the electrochromic layers 11 and 12.

A method for manufacturing the EC device will be described as follows.

First, the glass substrate 15 on which the transparent conductive oxide 13 is coated is cleaned thoroughly to prepare it for subsequent processing. The cleaning method employed is ultrasonic conditioning of the substrate to remove unwanted particulates. Then, the electrochromic layers 11 and 12 are deposited on the conductive layer 13. In general, the layers may be deposited by various techniques including physical vapor deposition, chemical vapor deposition, plasma enhanced chemical vapor deposition, and atomic layer deposition, to name a few. The term physical vapor deposition as used herein includes the full range of PVD techniques including sputtering, evaporation, ablation, and the like. Subsequently, the free-standing ion conducting layer 10 is placed on top of the electrochromic layer followed by the other glass substrate 16 on which the transparent conductive oxide 14 is coated.

The electrochromic device 1 has been prepared by depositing the electrochromic layer 11 which consists of polycrystalline $WO_3 \cdot H_2O$ nanosheets on the conductive layer 13. In another embodiment of the present invention, the electrochromic device 2 has been prepared by depositing the electrochromic layer 12 which consists of porous a-$WO_3$ on the conductive layer 13. The optical modulation in the 300-1600 nm range was recorded for both the device architectures.

A bi-layered electrochromic device 3 has been fabricated in which the electrochromic layers 11 and 12 are consecutively deposited on the conductive layer 13. The inventors observed an outstanding optical modulation and band selectivity of the bi-layered electrochromic device establishing the dynamic band-selectivity with voltage.

EXAMPLES

The following examples are given by the way of illustration and therefore should not be construed to limit the scope of the invention.

Example 1

Preparation of Active Electrode Comprising of Polycrystalline $WO_3 \cdot H_2O$ Nanosheets An electrochromic layer comprising of polycrystalline $WO_3 \cdot H_2O$ nanosheets was prepared as follows. $WO_3 \cdot H_2O$ powder was synthesized by an overnight reaction of W powder with $H_2O_2$. Initially, 5 g of W powder was dissolved in 60 ml of $H_2O_2$ (50%) under constant stirring for 24 h in an ice bath. The solution was then filtrated that resulted in a colorless transparent liquid. The excess hydrogen peroxide was decomposed by stirring the solution for 4 hours at 80° C. that changed the solution color to deep yellow; then covered and left for one week. Subsequent drying of this solution produced yellow colored hydrogen tungsten oxide hydrate ($WO_3 \cdot H_2O$) powder. In the second step, 0.5 g of $WO_3 \cdot H_2O$ powder was dispersed in 10 ml of distilled water by sonicating 7 hours.

The active electrode was prepared by drop casting 20 μL of the electrochromic solution on the clean FTO substrate (dimensions 1 cm×1 cm), which was subsequently evaporated at 50° C. for 15 min to form a uniform film. The thickness of the electrochromic layer is 800 nm.

Example 2

Preparation of Active Electrode Comprising of Porous a-$WO_3$ Layer

An electrochromic layer comprising of porous a-$WO_3$ layer was prepared as follows. $WO_3 \cdot H_2O$ powder was synthesized by an overnight reaction of W powder with $H_2O_2$. Initially, 5 g of W powder was dissolved in 60 ml of $H_2O_2$ (50%) under constant stirring for 24 h in an ice bath. The solution was then filtrated that resulted in a colorless transparent liquid. The excess hydrogen peroxide was decomposed by stirring the solution for 4 hours at 80° C. that changed the solution color to deep yellow; then covered and left for one week. Subsequent drying of this solution produced yellow colored hydrogen tungsten oxide hydrate ($WO_3 \cdot H_2O$) powder. In the second step, 0.5 g of $WO_3 \cdot H_2O$ powder was dissolved in 10 mL of 10% $H_2O_2$ by sonicating for 7 hours.

The active electrode was prepared by drop casting 20 μL of the electrochromic solution on the clean FTO substrate (dimensions 1 cm×1 cm), which was subsequently evaporated at 50° C. for 15 min to form a uniform film. The thickness of the electrochromic layer is 600 nm.

Example 3

Preparation of Electrochromic Bilayer Comprising of Polycrystalline $WO_3 \cdot H_2O$ Nanosheets and Porous a-$WO_3$ Layer The active electrode was prepared by drop casting 20 μL of the first solution mentioned in example 1 on the clean FTO substrate (dimensions 1 cm×1 cm), which was subsequently evaporated at 50° C. for 15 min to form a uniform film, followed by drop casting 20 μL of the second solution mentioned in example 2 on top of the first, which was again evaporated at 50° C. for 15 min to form a uniform film. The measured thickness of the first layer was 880 nm and of the second was 750 nm for this configuration.

Example 4

Preparation of Solid Polymer Electrolyte $LiClO_4$ was dried overnight at 110° C. in a vacuum oven. A measured amount of salt, PC (plasticizer) and PMMA (host, dried at 90° C., 12 h) were dissolved in THF and stirred for 24 h at room temperature. The mixture is then poured into a clean petri dish and covered by an aluminum foil with small punctures. The solvent was made to evaporate slowly at room temperature under dry nitrogen flow. Freestanding electrolyte film (130-250 μm thickness) can be peeled off from the petri dish after 24 h.

Example 5

Preparation of Electrochromic Devices

Figure 9:
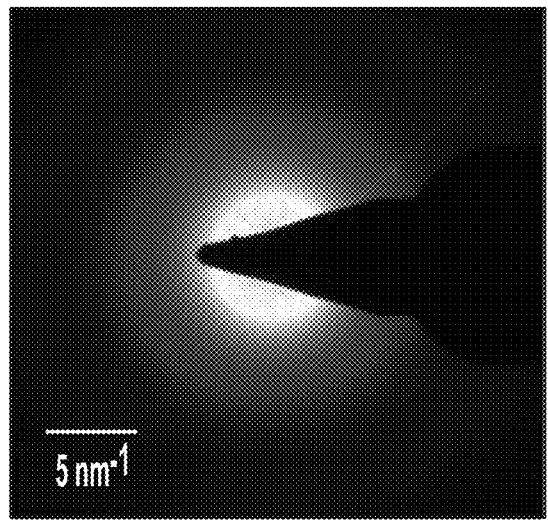
FIG. 9 represents the TEM image of the porous a-$WO_3$ of the present invention.
Figure 10:
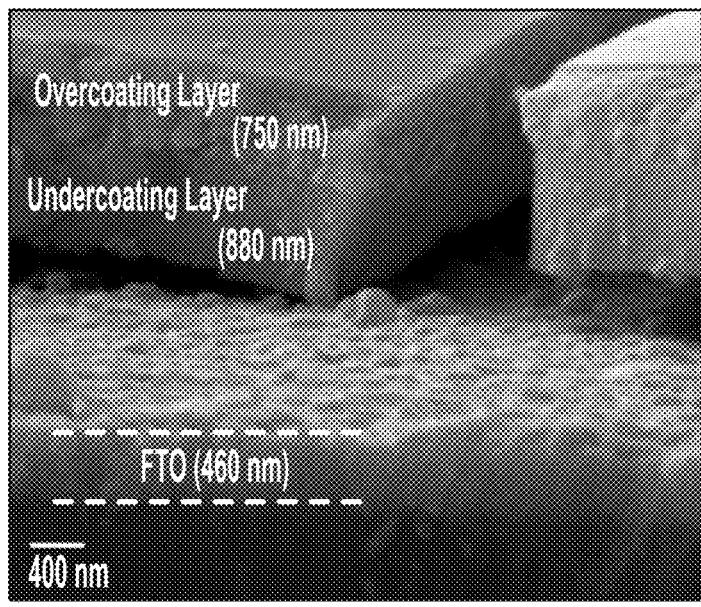
FIG. 10 represents the SEM image of the bilayer of the present invention.

The electrochromic device using polycrystalline $WO_3 \cdot H_2O$ nanosheets is fabricated as follows. The solid polymer electrolyte is sandwiched in between the active electrode prepared as mentioned in the example 1 and a second FTO glass. The FIGS. 9 and 10 show the electrochromic properties of the device made using polycrystalline $WO_3 \cdot H_2O$ nanosheets.

Figure 11:
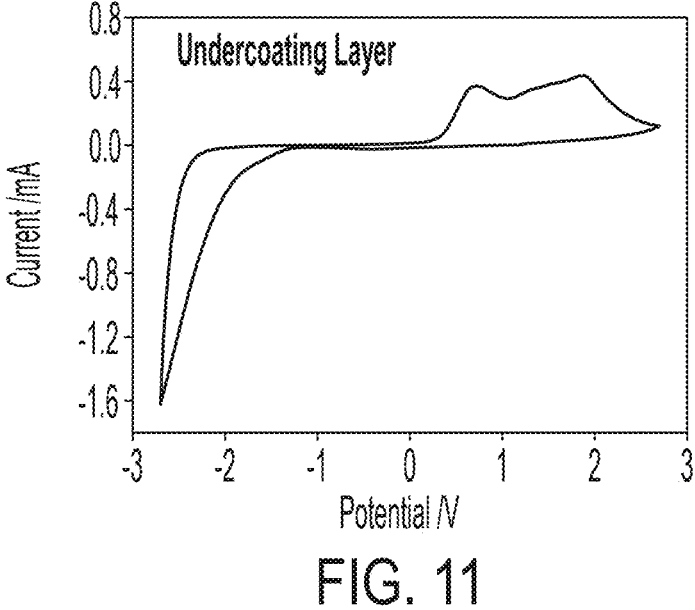
FIG. 11 represents the cyclic voltammetry plot of the electrochromic device made using polycrystalline $WO_3 \cdot H_2O$ nanosheets.
Figure 12:
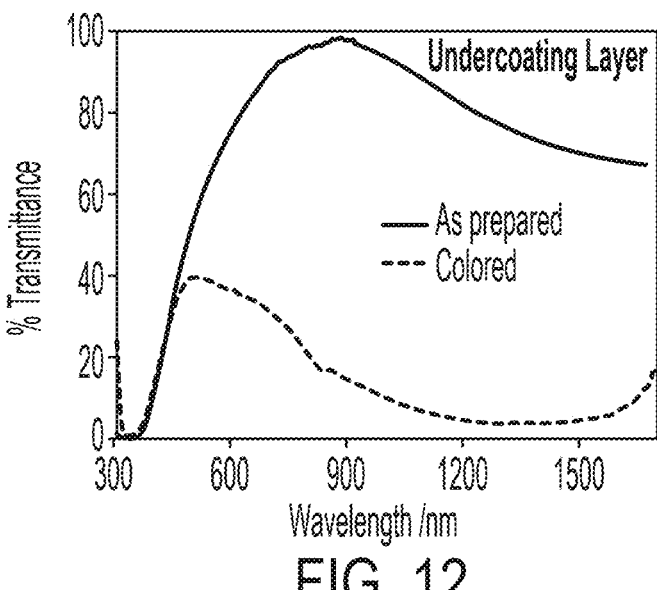
FIG. 12 represents the transmittance plot of the electrochromic device made using polycrystalline $WO_3 \cdot H_2O$ nanosheets.

The electrochromic device using porous a-$WO_3$ layer is fabricated as follows. The solid polymer electrolyte is sandwiched in between the active electrode prepared as mentioned in the example 2 and a second FTO glass. The FIGS. 11 and 12 show the electrochromic properties of the device made using porous a-$WO_3$ layer.

Figure 13:
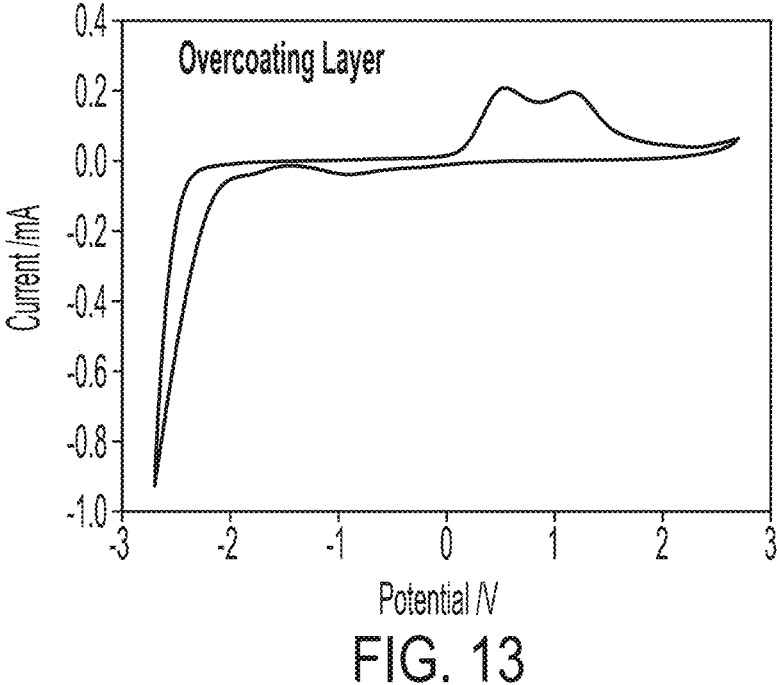
FIG. 13 represents the cyclic voltammetry plot of the electrochromic device made using porous a-$WO_3$ layer.
Figure 14:
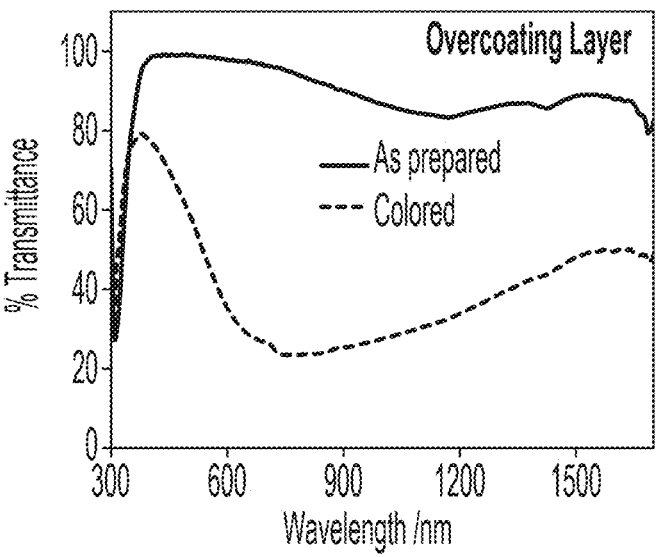
FIG. 14 represents the transmittance plot of the electrochromic device made using porous a-$WO_3$ layer.

The electrochromic bilayered device using polycrystalline $WO_3 \cdot H_2O$ nanosheets and porous a-$WO_3$ layer is fabricated as follows. The solid polymer electrolyte is sandwiched in between the active electrode prepared as mentioned in the example 3 and a second FTO glass. The FIGS. 13 and 14 show the electrochromic properties of the bi-layered device made using polycrystalline $WO_3 \cdot H_2O$ nanosheets and porous a-$WO_3$ layer.

Example 6

Testing Electrochromic Activities of Devices

ECDs using polycrystalline $WO_3H_2O$ nanosheets have been fabricated as detailed in example 5 and their modulation in the 300-1600 nm range was recorded. The fabricated devices turn dark blue with the application of −2.8 V and return to their bleached state with a reverse voltage of the same order. These devices show good visible contrast (49% at 650 nm) with superior NIR (800-1600 nm) blocking (66% at 1500 nm). The average coloration efficiencies of the devices were 39.4 $cm^2C^{-1}$ at 650 nm and 103.2 $cm^2C^{-1}$ 1500 nm.

ECDs using porous a-$WO_3$ layer have been fabricated as detailed in example 5 and their modulation in the 300-1600 nm range was recorded. The fabricated devices turn dark blue with the application of −2.5 V and return to their bleached state with a reverse voltage of the same order. These devices show excellent visible contrast (68% at 650 nm) with moderate NIR blocking (40% at 1500 nm). The average coloration efficiencies of the devices were 119.3 $cm^2C^{-1}$ at 650 nm and 60.8 $cm^2C^{-1}$ 1500 nm.

An electrochromic bi-layered device using polycrystalline $WO_3 \cdot H_2O$ nanosheets and porous a-$WO_3$ layer is fabricated as mentioned in example 5. The electrochromic material used in present invention being a cathodic coloring material, the active electrode is connected to the negative terminal of the sourcemeter. The inventors obtained 79-91% contrast in the NIR (780-1600 nm) range. The device remains dormant in the visible range while showing up to ~71% NIR modulation with the application of potential up to −2.2 V and beyond this point the device started to show activities in the visible range. The highest NIR blocking (91%) could be achieved with −2.3 V, although that accounts for ~9% transmission compromise at 600 nm. This device operation from 0 V−−2.3 V is defined as the cool mode. The visible transmittance (300-780 nm) of the device continued reduction with more negative voltages beyond −2.3 V. With −2.6 V, the device exhibited a visual modulation of 52-79% at (530-780 nm) range between the bleached and colored state, that is referred as the dark mode. The entire device operation is completely reversible with the reverse voltage of same order.

Advantages of the Invention

The ECDs fabricated using the prescribed bi-layered architecture, where the porous a-$WO_3$ layer was stacked over a layer of polycrystalline nanosheets of $WO_3 \cdot H_2O$ achieved a superior visual modulation at the visible range and an excellent contrast in the NIR range, setting a new global benchmark for electrochromic energy saving.

The modulation band of the ECD could be dynamically chosen by selectively tuning the coloration voltage and can operate in four major modes such as fully transparent (0 V), transparent+71% NIR modulation (−2.2 V), 9% visible+91% NIR modulation (−2.3 V), and full opacity (−2.8 V).

This inexpensive and exceptionally high performing dynamic ECD fabrication scheme is a big step forward for the new generation multifunctioning dynamic glass.

The invented process will make dynamic windows that will offer highly efficient energy saving in buildings/automotive sectors.

The developed process is economical and commercially viable. Therefore, by utilizing the present method, one can prepare electrochromic devices for smart energy utilization and savings.

We claim:

1. A bi-layered electrochromic electrode comprising:
   (i) a conductive base consisting of a substrate coated with a transparent conductive oxide;
   (ii) a first electrochromic layer coated on the conductive base; and
   (iii) a second electrochromic layer deposited on the first electrochromic layer, wherein:
   the first electrochromic layer and the second electrochromic layer have thicknesses from 10.0 nm to 3.0 μm;
   the transparent conductive oxide is selected from the group consisting of indium zinc oxide, fluorine doped tin oxide, fluorine doped zinc oxide, aluminum doped zinc oxide, and aluminum doped tin oxide;
   the first electrochromic layer is polycrystalline $WO_3 \cdot H_2O$ nanosheets; and
   the second electrochromic layer is porous a-$WO_3$ layer.

2. The bi-layered electrochromic electrode of claim 1, wherein the substrate is selected from the group consisting of glass, quartz, cellulose, silk, and plastics, the plastics being selected from the group consisting of polythene, polyimide, polyacrylate, and polycarbonate.

3. The bi-layered electrochromic electrode of claim 1, wherein the conductive base has a sheet resistance from 1.0 Ω/sq to 50.0 Ω/sq.

4. A bi-layered electrochromic device comprising:
   (a) a bi-layered electrochromic electrode according to claim 1;
   (b) an ion conducting layer placed on top of the second electrochromic layer of the bi-layered electrochromic electrode; and
   (c) a counter electrode placed over an exposed side of the ion conducting layer comprising a conductive base consisting of a transmissive or reflective substrate coated with transparent conductive oxide.

5. The bi-layered electrochromic device of claim 4, wherein the counter electrode is coated with a complimentary coating comprising a different electrochromic layer, the different electrochromic layer having an opposing voltage polarity response to that of the bi-layered electrochromic electrode.

6. The bi-layered electrochromic device of claim 4, wherein the bi-layered electrochromic device is operative to change color upon application of a voltage from 0.5 V to 10.0 V or from −0.5 V to −10.0 V against the counter electrode.

7. The electrochromic device of claim 4, wherein the ion conducting layer comprises a solution/dispersion/polymeric film comprising $H_2SO_4$, $Li^+$ based salts, $Na^+$ based salts, $K^+$ based salts, $Al^{3+}$ based salts, or combinations thereof.

8. The electrochromic device of claim 4, wherein the electrochromic device, when subjected to a voltage from 0.5 V to 10.0 V or from −0.5 V to −10.0 V with respect to the counter electrode, exhibits a superimposed spectral response arising from the first electrochromic layer, the second electrochromic layer, and any complimentary coating included in the counter electrode.

9. An electronic device comprising the bi-layered electrochromic device according to claim 4, wherein the electronic device is chosen from a smart window, a smart mirror, an e-paper, a smart display, a helmet visor, smart ophthalmic glasses, an optical data storage device, a glare reduction set-up, a heat-transmission modulator, a light-transmission modulator, or an integrated charge storage device.

* * * * *